(12) United States Patent
Graceffo et al.

(10) Patent No.: US 10,169,613 B2
(45) Date of Patent: Jan. 1, 2019

(54) SYSTEMS AND METHODS FOR WAVEFORM WATERMARKING

(71) Applicant: Raytheon Company, Waltham, MA (US)

(72) Inventors: Gary M. Graceffo, Burke, VA (US); Andrew Kowalevicz, Arlington, VA (US)

(73) Assignee: Raytheon Company, Waltham, MA (US)

( * ) Notice: Subject to any disclaimer, the term of this patent is extended or adjusted under 35 U.S.C. 154(b) by 360 days.

(21) Appl. No.: 15/052,181

(22) Filed: Feb. 24, 2016

(65) Prior Publication Data

US 2017/0244443 A1 Aug. 24, 2017

(51) Int. Cl.
*H04L 9/32* (2006.01)
*G06F 21/64* (2013.01)

(52) U.S. Cl.
CPC .................... *G06F 21/64* (2013.01)

(58) Field of Classification Search
CPC ........ G06F 21/64; H04B 1/707; H04L 9/3247
See application file for complete search history.

(56) References Cited

U.S. PATENT DOCUMENTS

| 2005/0175116 A1* | 8/2005 | Feher | H04B 1/69 375/267 |
| 2008/0260067 A1* | 10/2008 | Wengerter | H04L 1/0003 375/298 |
| 2015/0318982 A1* | 11/2015 | Kowalevicz | H04L 9/16 375/238 |

* cited by examiner

*Primary Examiner* — Abiy Getachew
(74) *Attorney, Agent, or Firm* — Schwegman Lundberg & Woessner, P.A.

(57) ABSTRACT

Generally discussed herein are systems, devices, and methods for waveform watermarking. A device can include an overt symbol modulator to receive mapped overt data and provide overt data modulated in accord with an overt data modulation scheme, a covert symbol modulator to receive mapped covert data and provide, using dither modulation and micro-amplitude modulation, covert data modulated in accord with a covert data modulation scheme, a switch to receive the modulated covert data and the modulated overt data and forward the covert data and modulated overt data based on a signal indicating whether covert data is to be transmitted or covert data is to be transmitted, and transmission circuitry to produce an electromagnetic waveform of the modulated data from the switch.

19 Claims, 7 Drawing Sheets

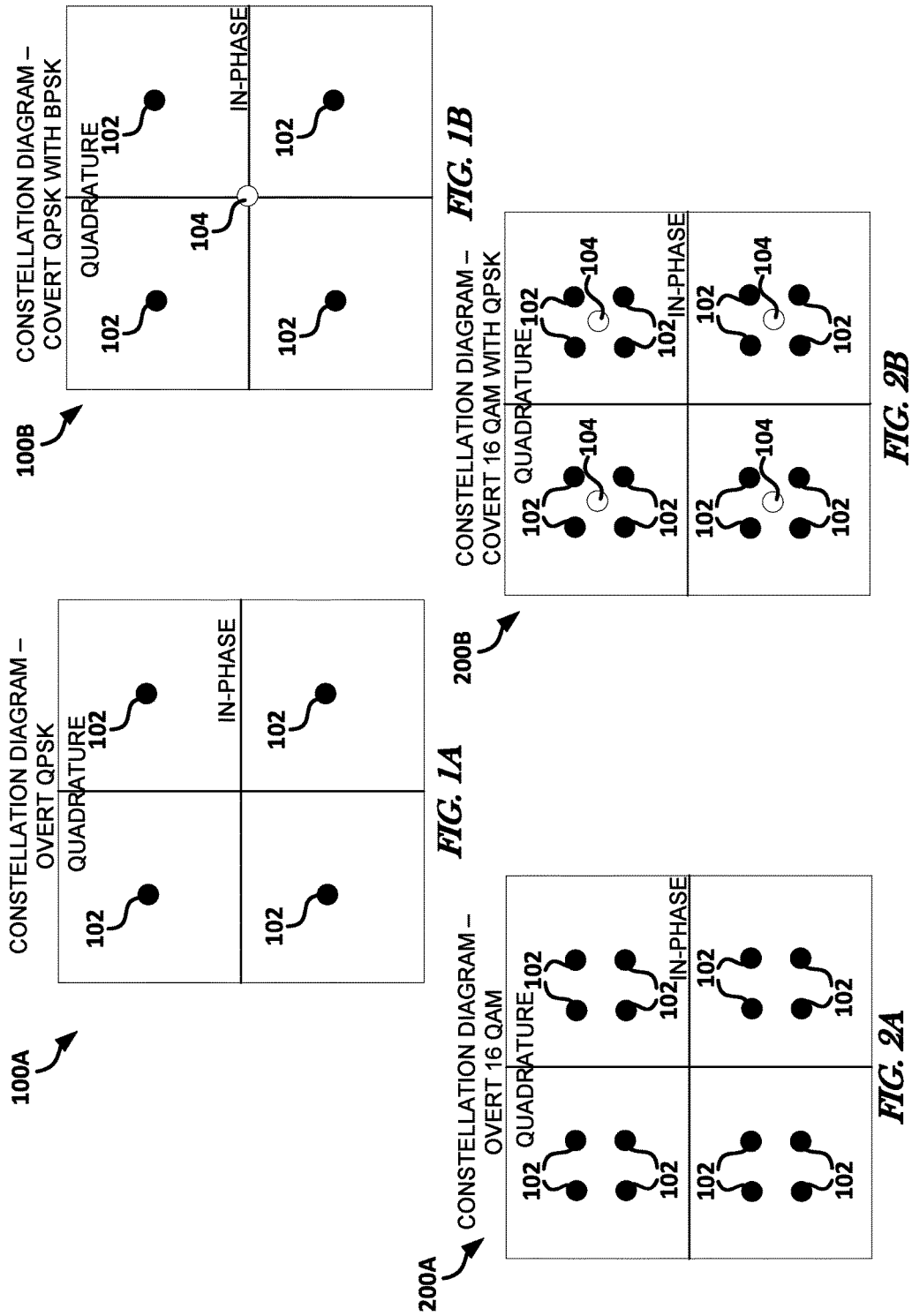

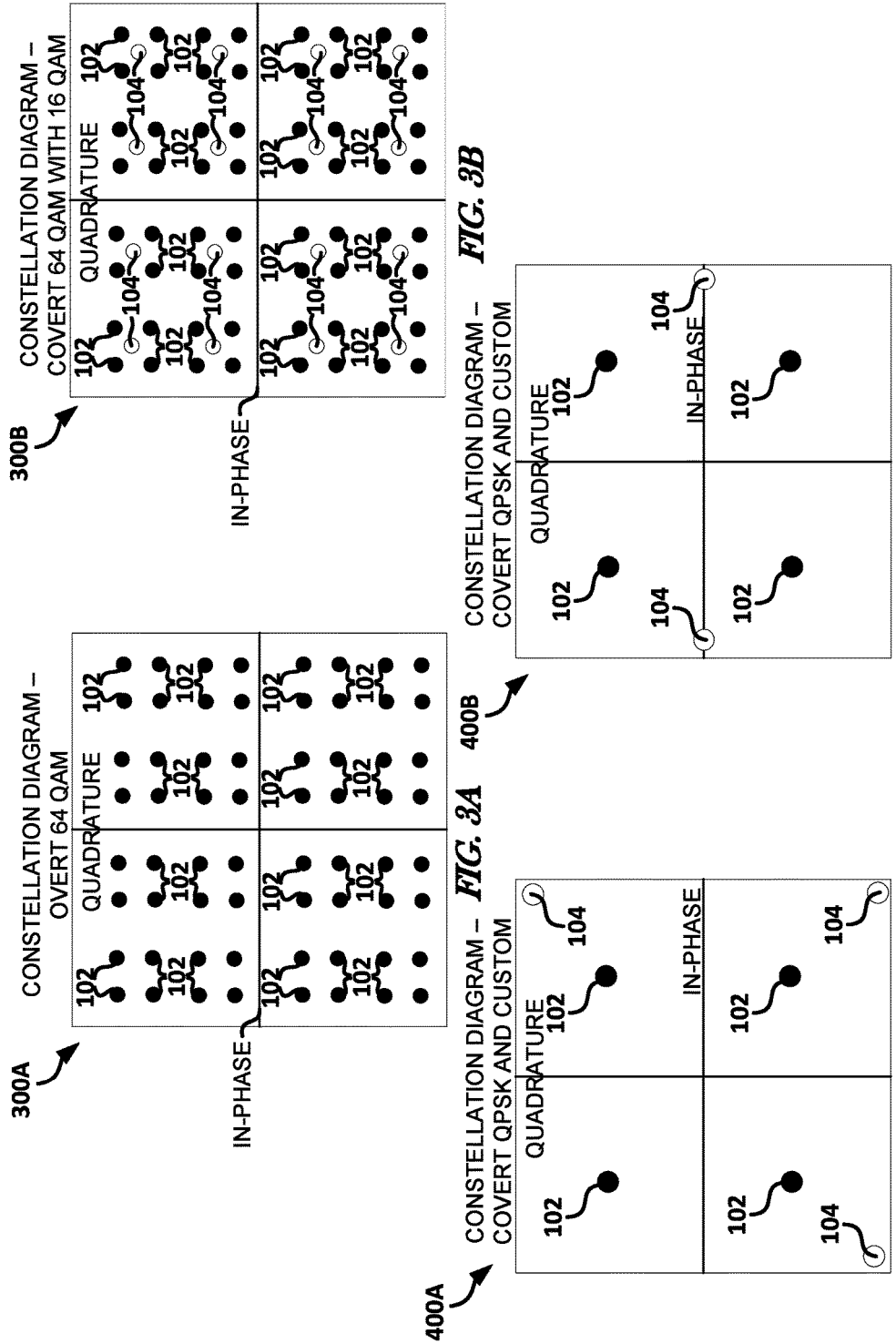

SYSTEMS AND METHODS FOR WAVEFORM WATERMARKING

TECHNICAL FIELD

Embodiments discussed herein generally relate to information security and assurance. One or more embodiments regard watermarking a waveform.

BACKGROUND

An amount of information transmitted between users continues to grow. Integrity is generally not guaranteed. Generally, when a procedure to help ensure integrity of data is created, a countermeasure is created to defeat or circumvent the procedure.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

FIG. 1A illustrates, by way of example, a graph of a Quadrature Phase Shift Keying (QPSK) constellation.

FIG. 1B illustrates, by way of example, a graph of a QPSK constellation with a covert Binary Phase Shift Keying (BPSK) watermark symbol region, in accord with one or more embodiments.

FIG. 2A illustrates, by way of example, a graph of a 16 Quadrature Amplitude Modulation (QAM) symbol constellation.

FIG. 2B illustrates, by way of example, a graph of a 16 QAM constellation with a covert QPSK watermark, in accord with one or more embodiments.

FIG. 3A illustrates, by way of example, a graph of a 64 QAM symbol constellation.

FIG. 3B illustrates, by way of example, a graph of a 64 QAM constellation with a covert 16 QAM watermark, in accord with one or more embodiments.

FIG. 4A illustrates, by way of example, a graph of a QPSK symbol constellation with three covert symbol regions, in accord with one or more embodiments.

FIG. 4B illustrates, by way of example, a graph 400B of a QPSK constellation with two covert symbol regions, in accord with one or more embodiments.

DETAILED DESCRIPTION

Figure 5:
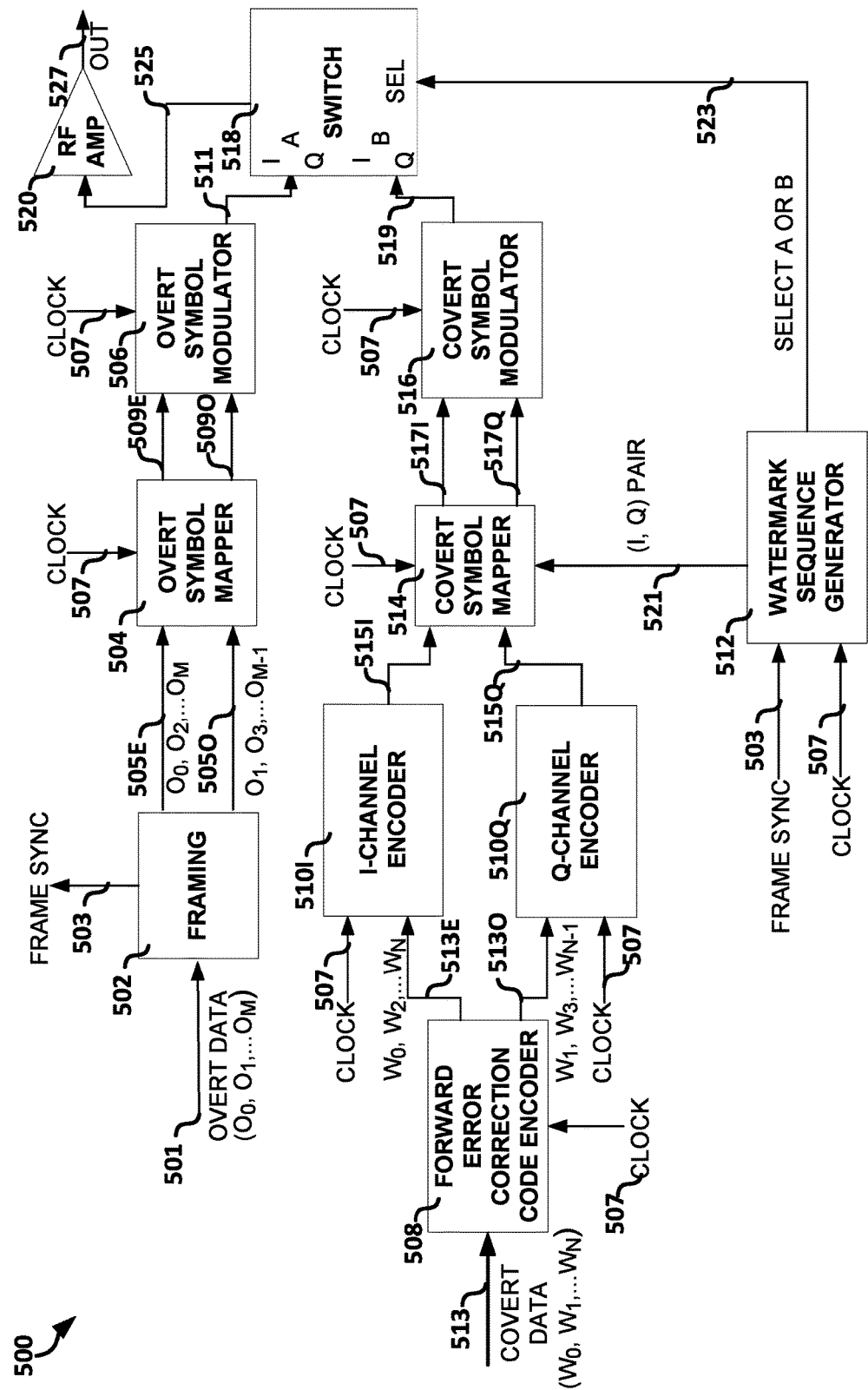
FIG. 5 illustrates, by way of example, a logical block diagram of a transmitter 500, in accord with one or more embodiments.

Embodiments in this disclosure generally regard systems, devices, and methods for transmitting data between devices. One or more embodiments help ensure integrity of data wirelessly transmitted between devices, such as by watermarking the transmitted data with a covert symbol. One or more embodiments provide an ability to switch between transmitting a watermarked waveform and an overt waveform (a non-watermarked waveform).

Information transferred between devices can be intercepted, spoofed, or otherwise tampered with. The information can be tampered with such that the user receiving the information may not be able to determine whether the information was provided from a device or location indicated in a corresponding communication, the information is the same as the information that was intended to be provided, and/or whether the information was intercepted and retransmitted. Since an amount of information transferred between users continues to increase, ensuring integrity of information moving between users is becoming more important.

Discussed herein are systems, devices, and methods for watermarking a waveform. Any attempt to capture or alter a watermarked waveform, which is encoded using the technique described herein, with an insufficient receiver will result in a loss of the watermark. If an alteration is detected (e.g., the watermark is not detected in the waveform) an alarm can be triggered, such as to alert proper personnel.

In one or more embodiments, the watermark can be situated among other symbols transmitted between the devices. In one or more embodiments, the watermark is situated among symbols used in a signaling constellation, such as an M-ary signaling constellation. In one or more embodiments, the watermark can be situated among symbols comprising a sub-constellation of the constellation. A sub-constellation is a region, existing in one quadrant, having a symbol at each vertex and having straight lines connecting the vertices not passing through any other symbols in that constellation.

A host (overt) communications channel can be transmitted using a clock as a frequency reference. A covert communication can be applied to the host signal by modulating the jitter on the reference clock of a transmitter. The jitter can represent the covert (hidden) communication. In one or more embodiments, while the jitter representing the covert communication is deterministic, it can be implemented such that it appears Gaussian in nature and remains within the normal operational levels of jitter for a less stable frequency standard than the clock of the transmitter. In one or more embodiments, the jitter for a less stable clock than that of the transmitter is orders of magnitude less in jitter stability than the clock transmitter. Jitter can be introduced on the clock and applied to the transmitted signals, such as to provide watermarked or covert data. Depending on the implementation, the jitter is seen on the carrier phase (modified zero crossings) and/or the data symbol falling edge (modulation of to the pulse duration, the quadrature). A receiver using a clock with jitter stability on the order of the stability of the transmitter clock can help detect the jitter and can provide an ability to demodulate it. Without the proper jitter stability, the covert message is imperceptible and irrecoverable.

FIG. 1A illustrates, by way of example, a graph 100A of a Quadrature Phase Shift Keying (QPSK) constellation. FIG. 1B illustrates, by way of example, a graph 100B of a QPSK constellation with a covert Binary Phase Shift Keying (BPSK) watermark symbol region, in accord with one or more embodiments. On the y-axis of both graphs 100A-B is the quadrature (Q) portion of a signal and on the x-axis is the in-phase (I) portion of the signal. The symbols 102 are overt symbols and the symbol region 104 is a region in which a covert symbol (i.e. watermark symbol) can be situated, in one or more embodiments. A combination of an overt symbol and a covert symbol is sometimes referred to a covert data herein.

The QPSK constellation comprises a single symbol 102 in each quadrant of the QPSK scheme. The covert symbol region 104 is situated among the symbols of the constellation, such as to be generally equidistant from each of the symbols on the graph and/or within a perimeter defined by lines connecting symbols in directly adjacent quadrants. The example shown in FIG. 1B shows an embodiment in which a constellation and sub-constellation comprise the same symbols.

FIG. 2A illustrates, by way of example, a graph 200A of a 16 Quadrature Amplitude Modulation (QAM) symbol constellation. FIG. 2B illustrates, by way of example, a graph 200B of a 16 QAM constellation with a covert QPSK watermark, in accord with one or more embodiments. On the y-axis of both graphs 200A-B is the Q portion of the signal and on the x-axis is the I portion of the signal. The symbols 102 are overt symbols and the symbol regions 104 are regions in which a covert symbol can be situated.

The 16 QAM constellation comprises a plurality of sub-constellations, one sub-constellation in each quadrant of the 16 QAM scheme. The covert symbol regions 104 are situated among respective symbols of a sub-constellation, such as to be generally equidistant from each of the symbols on the graph and/or within a perimeter defined by considering each of the symbols 102 as vertices and including lines 106 connecting the symbols 102 to form a polygon. The covert symbols 104 of FIG. 2B comprise a QPSK signal.

FIG. 3A illustrates, by way of example, a graph 300A of a 64 QAM symbol constellation. FIG. 3B illustrates, by way of example, a graph 300B of a 64 QAM constellation with a covert 16 QAM watermark, in accord with one or more embodiments. On the y-axis of both graphs 300A-B is the Q portion of the signal and on the x-axis is the I portion of the signal. The symbols 102 are overt symbols and the symbol regions 104 are regions in which a covert symbol can be situated.

The 64 QAM constellation comprises a plurality of sub-constellations, four sub-constellations in each quadrant of the 64 QAM constellation. The covert symbol regions 104 are situated among respective symbols of a sub-constellation, such as to be generally equidistant from each of the symbols on the graph and/or within a perimeter defined by considering each of the symbols 102 as vertices and including lines 106 connecting the symbols 102 to form a polygon. The covert symbol regions 104 of FIG. 3B comprise a 16 QAM constellation.

FIG. 4A illustrates, by way of example, a graph 400A of a QPSK symbol constellation with three covert symbol regions 104, in accord with one or more embodiments. FIG. 4B illustrates, by way of example, a graph 400B of a QPSK constellation with two covert symbol region 104, in accord with one or more embodiments. FIGS. 4A and 4B illustrate embodiments in which the covert symbol region 104 are situated outside a sub-constellation (the constellation and sub-constellation are equivalent in FIGS. 4A-4B). The covert symbol regions 104 can generally be located anywhere on quadrature-in-phase plane such that the covert symbols can be detected by an appropriate receiver and not mistaken for an overt symbol.

In the FIGS. 1A-1B, 2A-2B, and 3A-3B the overt constellations are M-ary signal constellations, where M is an integer, and the covert signal constellations are M/4-ary signal constellations. That is, the number of symbols in the covert signal constellations is one fourth of the number of symbols in the overt signal constellation. This need not be the case, such as shown in embodiments of FIGS. 4A-4B. In these FIGS. the number of overt symbols in the constellation to the number of covert symbol regions is not 4:1. In general, the number of overt symbols in the constellation to the number of covert symbol regions can be a ratio M:N, where M and N are both integers greater than zero. Also, the location of the covert symbol region(s) 104 can be any location at which the symbol can be detected and not mistaken for an overt symbol and located in the I-Q plane using dither modulation. The possible locations for the covert symbol region(s) are thus application specific and depend on the resolution of the hardware, software, and/or firmware in the transmitter and/or the receiver.

FIG. 5 illustrates, by way of example, a logical block diagram of a transmitter 500, in accord with one or more embodiments. The transmitter 500 as illustrated includes an overt data path and a covert data path. The overt data path, as illustrated, includes a framing module 502, an overt symbol mapper 504, and an overt symbol modulator 506. The covert data path, as illustrated, includes a forward error correction code encoder (FECCE) 508, an I-channel encoder 510I, a Q-channel encoder 510Q, a watermark sequence generator 512, a covert symbol mapper 514, and a watermark modulator 516. The covert data path and the overt data path are both coupled to a switch 518, which determines whether data on the overt data path or the covert data path is forwarded to a radio frequency (RF) amplifier 520.

The overt data path is discussed, followed by a discussion of the covert data path. The framing module 502 receives overt data ($O_0, O_1, O_2 \ldots O_M$), where M is an integer. For the sake of this discussion, M is assumed to be an even number, however, M can be an odd number. The framing module 502 arranges the overt data into blocks of data. The data produced by the framing module 502 can generate packetized even symbols 505E and packetized odd symbols 505O organized into one or more packet(s). The packets are data organized into logical groups. The packets can affect how the overt symbol mapper 504 interprets that data and which (I, Q) values are associated with the data. The framing module 503 can produce a frame sync signal 503 that indicates when a frame ends and/or begins.

The overt symbol mapper 504 operates using a clock 507. The overt symbol mapper 504 receives the packetized even symbols 505E and packetized odd symbols 505O and produces (I, Q) pairs based on the value of the symbols 505E and 505O, respectively. The (I, Q) pairs and the symbols 505E and 505O are provided to the overt symbol modulator 506, such as on the connections 509E and 509O, respectively.

The clock 507 can be a high precision oscillator (HPO), such as a crystal oscillator or a laser oscillator. In one or more embodiments, the HPO can include a femtosecond, narrow linewidth laser (a laser in which the error of the signal produced is on the order of $10^{-15}$ seconds). Such HPO oscillators are helpful, such as to produce low noise such as can help provide pico-modulation (modulation that can be controlled to within an error on the order of ($10^{-12}$). The overt data can be dithered, such as based on signals provided by a watermark sequence generator (WSG) 512. Dithering the data is discussed with regard to the WSG 512.

The overt symbol modulator 506 operates using the clock 507. The overt symbol modulator 506 receives the (I, Q) pairs and the even and odd overt symbols, and produces a waveform modulated in phase and quadrature so as to carry the data corresponding to the even and odd overt symbols.

The modulated waveform is provided to the switch 518, such as on the connection 511.

The covert data path includes covert data ($W_0, W_1 \ldots W_N$) 513 provided to the FECCE 508. For the sake of this discussion, N is assumed to be an even number, however, N can be an odd number. The FECCE 508 operates based on the clock 507. The FECCE 508 implements operations for performing a technique used for controlling errors in a data transmission, such as over a noisy or unreliable data channel. Using a forward error correction (FEC) technique, data is encoded in a redundant manner so as to increase a likelihood that the data received can be accurately decoded. Using a FEC code technique a number of errors can be tolerated (per bit, byte, message, or the like) while allowing the receiver to still accurately decode the FEC encoded data. Examples of FEC techniques include turbo codes and low density parity check (LDPC) codes. The FECCE 508 provides data encoded using the FEC technique. The encoded data from the FECCE 508 can include even encoded covert symbols ($W_0, W_2 \ldots W_N$) 513E and odd encoded overt symbols ($W_1, W_3 \ldots W_{N-1}$) 513O, where N is assumed even, similar to M as previously discussed.

The I-channel encoder 510I and the Q-channel encoder 510Q operate based on the clock 507. The I-channel encoder 510I receives the symbols 513E and provides the symbols (using connection 515E) encoded based on a modulating scheme. The Q-channel encoder 510Q receives the symbols 513O and provides the symbols (using connection 515O) encoded based on a modulating scheme, such as the same modulating scheme as implemented by the I-channel encoder 510I.

In one or more embodiments, the encoding performed by the I-channel encoder 510I and the Q-channel encoder 510Q is a spread spectrum modulation technique. A spread spectrum modulation technique generates a signal with a bandwidth that is deliberately spread in the frequency domain resulting in a signal with a wider bandwidth. The spread spectrum encoder modulates a signal in excess of a bandwidth that is used for transmitting the overt data (using the overt data path). A spread spectrum technique can help reduce the power spectral density of the overt data and help increase chances of detecting lower signal energy covert data among the overt data. This will help in detecting the watermark among the overt data. Since the watermark will be harder to detect using a reduced signal energy, and reducing the energy increases the chances of an error, turbo coding or some other FEC code can help achieve lower error rates in detection. Examples of spread spectrum encoders include direct-sequence spread spectrum (DSSS) encoding technique, frequency-hopping spread spectrum, and time-hopping spread spectrum, among others.

The WSG 512 operates based on the clock 507. The WSG 512 receives the frame sync 503, such as to determine when a new frame (block of data symbols) is beginning and/or a frame is ending. The WSG 512 can implement a predetermined process, such as a random process to place covert data among the overt data. The random process can use a random number generator known to both the receiver and transmitter. In one or more embodiments, in response to the frame sync 503 indicating the start of a frame, the WSG 512 determines where (in the I-Q plane and in the overt data) to place the covert data (to adjust the overt data to include the covert data), such as by counting data clock cycles (of the clock 507). The number of data clock cycles and/or the location in the I-Q plane can be determined by one or more random numbers. A single number (e.g., a generated random number or predetermined number) can be mapped to a specific location in the overt data and the I-Q plane or different numbers can be used for each of the specific location in the overt data and the I-Q plane. The random numbers can either be determined a priori (precomputed and looked up during runtime) or computed during runtime.

The WSG 512 determines when a frame ends by either computing clock cycles and knowing how many clock cycles are in a frame or from receiving a signal from the frame sync 503 indicating a new frame has begun or that the previous frame has ended. The random number used can either be reset at the start of each block, continue across multiple blocks (repeat after a specified number of blocks), or be random across all blocks (a new random number calculated or identified, such as by looking up the new random number, for each block). The WSG 512 provides the (I, Q) pair (the location of the covert data in the I-Q plane) to the covert symbol mapper 514. The WSG 512 also provides a control signal, select A or B 523, to the switch 518.

In one or more embodiments, the WSG 512 chooses (I, Q) values for the covert data within a predefined region. The (I, Q) values chosen for the covert data can be statistically distributed through the predefined region, such as to make the covert data appear as noise. The statistical distribution in one or more embodiments can be a Gaussian distribution. The (I, Q) values for the covert data can be introduced into the signal by dithering the clock 507.

Some laser clocks permit very fine phase resolution, on the order of femtoseconds, at high clock rates (on the order of gigahertz). This jitter is three orders of magnitude better than that of standard, commercially available oscillators. This improvement in clock jitter can be exploited for covert communications as previously discussed and is further explained with regard to FIG. 6 and elsewhere herein. The dither modulation can allow the ability to provide a very accurate phase and a similar technique can be used to modulate the amplitude of a signal and provide a signal precisely located in the I-Q plane.

Figure 6:
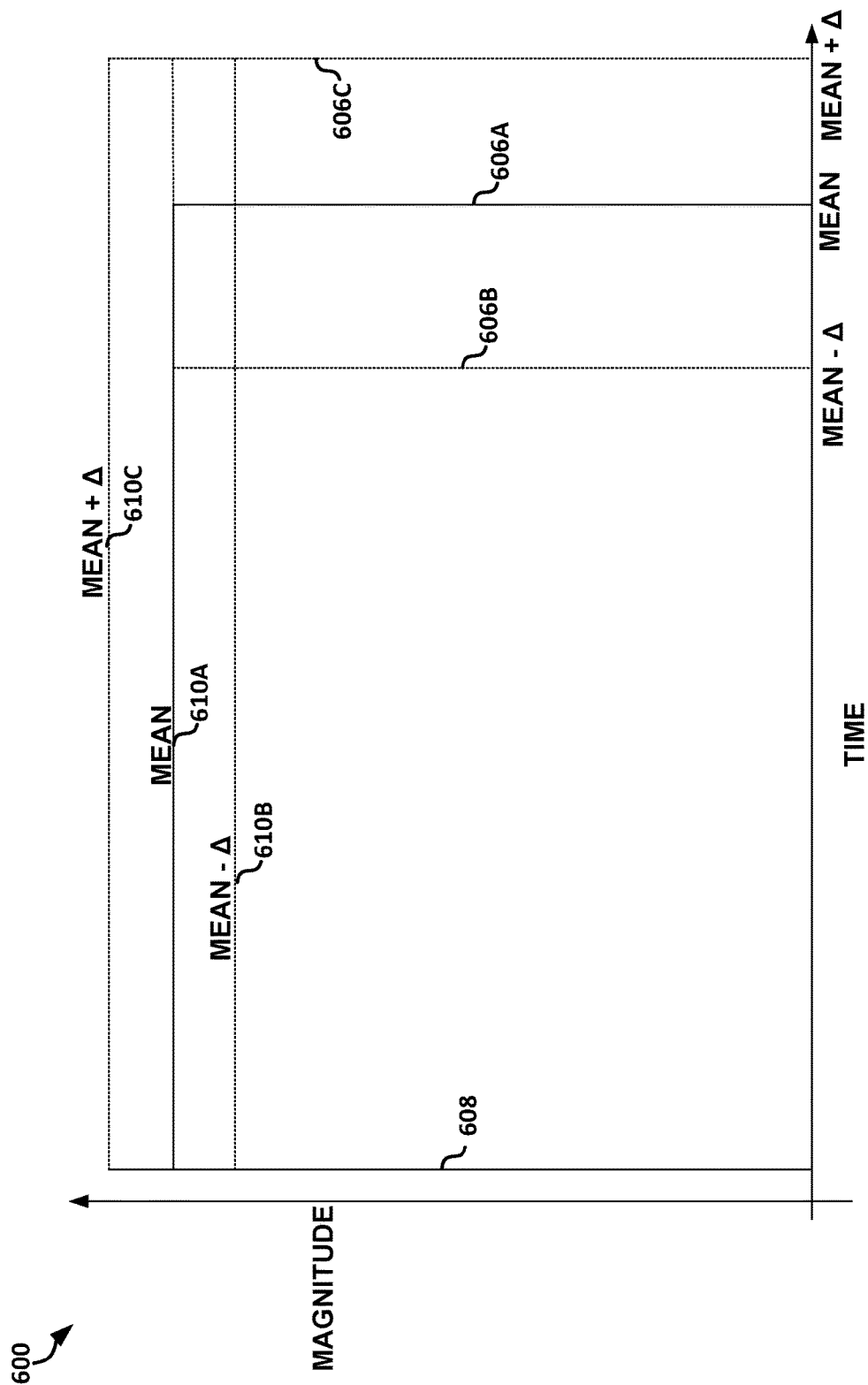
FIG. 6 illustrates, by way of example, a diagram of a pulse with a variable width, in accord with one or more embodiments.

FIG. 6 illustrates, by way of example, a diagram of a pulse 600 with a variable falling edge 606 (e.g., falling edge 606A, falling edge 606B, and falling edge 606C), and a variable amplitude, in accord with one or more embodiments. Jitter is a deviation from true periodicity of an assumed perfectly periodic signal. As shown in FIG. 6, jitter causes the falling edge 606 and/or rising edge 608 of the pulse 600 to dither about a mean value. The mean value corresponds to a true periodicity. In some laser oscillators, an average jitter (a distance between the mean and the actual falling edge zero crossing) is on the order of femtoseconds. In a typical clock, however, the jitter is on the order of picoseconds at best.

Consider an example in which the mean, mean−Δ, and mean+Δ represent the normal jitter of a "normal" clock with jitter one or more orders of magnitude greater than a clock of the transmitter. This normal clock will not be able to detect differences between a falling edge anywhere in the range between mean−Δ and mean+Δ. However, a clock with a normal jitter one or more orders of magnitude better than the normal clock will be able to control and/or detect the falling edge 606 within this range. This ability can be exploited to transmit covert data embedded within the overt data. An in-phase component of covert data can be determined based on these small changes in the timing that cannot be detected by systems using normal clocks.

Similarly, an amplitude 610 (610A, 610B, and/or 610C) of the pulse 600 can be modulated within noise bounds of a ADC or other circuitry of the receiver. This can be accomplished using techniques (e.g., optical based techniques) that covert a phase change to an amplitude change. The amplitude change provides for amplitude level modulation. The mean amplitude 610A represents a perfect amplitude (an amplitude as expected) and the mean−Δ and mean+Δ represent the lower and upper bounds of the perfect amplitude within noise constraints. By modulating the amplitude of a signal within these noise bounds, a signal can pass through a normal receiver system without detection.

The location of the covert symbol can be distributed throughout a given region (the region defined by the maximum allowable jitter that is within the normal operating range of the normal clock and within a maximum allowable amplitude shift) so as to appear as normal noise. Since noise is normally distributed (Gaussian distributed) the location of the covert symbol can be changed over time to appear as Gaussian noise to a system using a normal clock. Altering the falling edge within the limits of the normal clock in accord with a Gaussian distribution is sometimes referred to as Gaussian dither modulation herein.

The covert symbol mapper 514 operates based on the clock 507. The covert symbol mapper 512 receives the encoded even symbols 515E and odd symbols 515O (e.g., twice encoded symbols, once encoded by the FECCE 508 and once encoded by the encoder 510I or 510Q), and an (I, Q) pair from the watermark sequence generator 516 and produces (I, Q) and symbol pairs based on the value of the symbols 515E and 515O and the (I, Q) pair 521. The (I, Q) pair from the connections 515I and 515Q is translated, by the covert symbol mapper 514, to an amount of deviation of a falling edge of a symbol as indicated by the (I, Q) pair 521, which can be interpreted as a shift of in-phase or quadrature of the symbol. The translated (I, Q) pairs and the symbols 515E and 515O (e.g., turbo code encoded and DSSS encoded symbols in one or more embodiments) are provided to the covert symbol modulator 516 on the connections 517I and 517Q.

The covert symbol modulator 516 operates based on the clock 507. The covert symbol modulator 516 impresses the encoded data onto a carrier with the appropriate and I and Q. The covert symbol modulator 516 receives I-channel data and Q-channel data from the covert symbol mapper 514. The symbols are adjusted by the covert symbol mapper 514 to account for the jitter as indicated by the (I, Q) pair 521. The covert symbol modulator 516 produces a waveform modulated in phase and quadrature so as to carry the data corresponding to the I-channel data and the Q-channel data provided on the connections 517I and 517Q. The modulated waveform is provided to the switch 518 on the connection 519.

The switch 518 can be a transistor-based switch, a logic gate based switch, such as a multiplexer, or other type of electric or electronic switch. The switch receives the modulated waveforms from the overt symbol modulator 506 and the covert symbol modulator 516 and provides, on connection 525, the modulated waveform indicated by the select A or B 523. If the select A or B indicates to select the covert waveform, the covert waveform (selection B) is provided on the connection 525. Similarly, if the select A or B 523 indicates to select the overt waveform, the overt waveform (selection A) is provided on the connection 525.

The RF amp 520 amplifies the wave provided on the connection 525 (the overt waveform or covert waveform). The RF amp 520 provides the amplified waveform as an output 527. The output 527 is generally transmitted through an antenna (see FIG. 9) which converts the electric signal to an electromagnetic wave that propagates through air or another medium.

Figure 7:
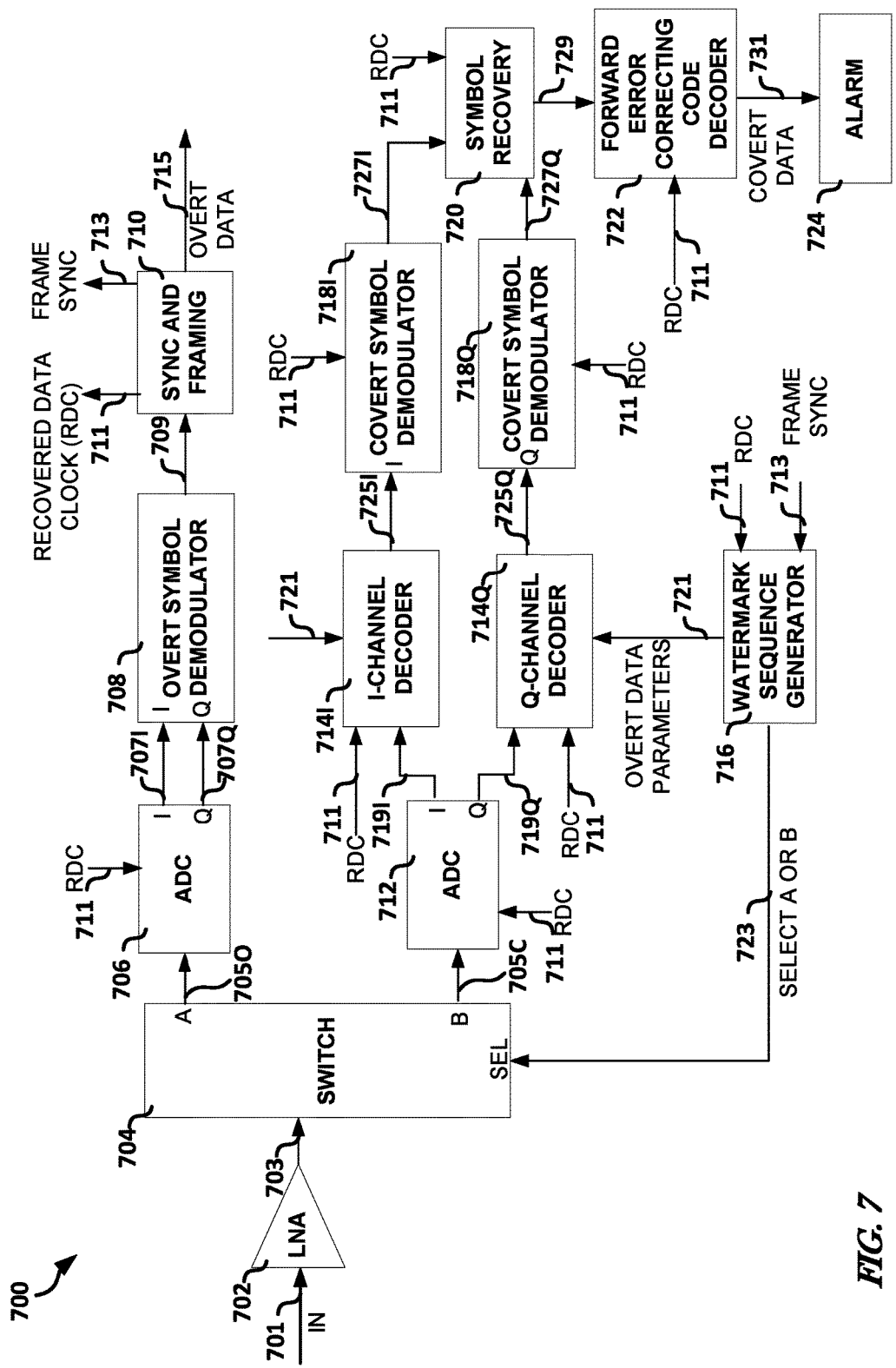
FIG. 7 illustrates, by way of example, a logical block diagram of a receiver, in accord with one or more embodiments.

FIG. 7 illustrates, by way of example, a logical block diagram of a receiver 700, in accord with one or more embodiments. The receiver 700 as illustrated includes an overt data path and a covert data path. Both overt and covert data paths are coupled to a Low Noise Amplifier (LNA) 702 and a switch 704. The overt data path, as illustrated, includes an analog to digital converter (ADC) 706, an overt symbol demodulator 708, and a sync and framing module 710. The covert data path includes an ADC 712, an I-channel decoder 714I, a Q-channel decoder 714Q, a watermark sequence generator 716, an I-channel covert symbol demodulator 718I, a Q-channel covert symbol demodulator 718Q, a symbol recovery module 720, a forward error correcting code decoder 722, and an alarm module 724.

Figure 9:
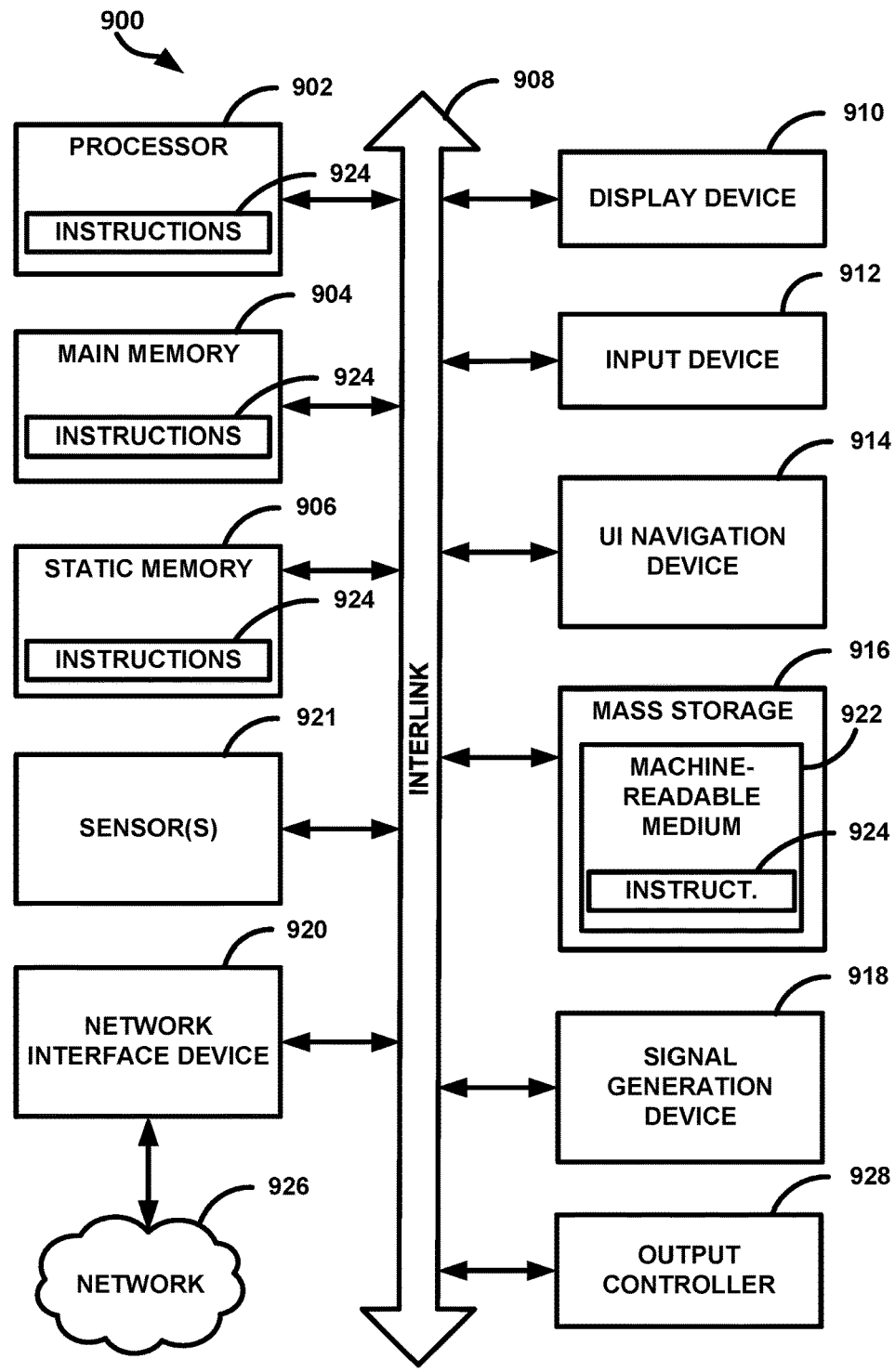
FIG. 9 illustrates, by way of example, a block diagram of an embodiment of a machine on which one or more of the operations as discussed herein can be implemented.

The LNA 702 receives a signal ("in" 701), such as can be from an antenna (see FIG. 9). The LNA 702 is configured to amplify a low-power signal without significantly degrading a signal to noise ratio (SNR) of the signal.

The switch 704 is controlled by a select line (select A or B 723) from a watermark sequence generator 716. The switch 704 is similar to the switch 518.

The overt data path begins with the ADC 706. The ADC 706 converts the amplified signal from the LNA 702 that is provided to the switch 704 through connection 703 and to the ADC 706 through connection 705O. The ADC 706 converts the analog signals received to digital signals. The ADC 706 provides an in-phase digital signal on connection 707I and a quadrature digital signal on connection 707Q.

The overt symbol demodulator 708 receives both the in-phase digital signal 707I and the quadrature digital signal 707Q and demodulates them. Demodulating the in-phase digital signal 707I and the quadrature digital signal 707Q includes generally performing inverse operations of the overt symbol modulator 506. The overt symbol demodulator 708 provides demodulated data on the connection 709 to the sync and framing module 710.

The sync and framing module 710 receives the demodulated data and produces the overt data 715, a recovered data clock 711, and a frame sync 713. The sync and framing module determines the data clock based on the one or more frequencies of data as produced by the overt symbol demodulator 708. The data clock 711 is substantially similar to the clock 507. The sync and framing module 710 includes a clock recovery circuit that can substantially re-create a clock signal that was used to create the data received (the clock 507). The clock recovery circuit can operate based on a frequency of a received carrier signal or some other reference clock. The clock recovery circuit generates a clock from an approximate frequency reference, and then phase-aligns to the transitions in the data stream, such as by using phase-locked loop (PLL).

The frame sync 713 is recovered based on data in the received transmission. The data can include a preamble (a specified sequence of one or more bits) that indicates a beginning of a frame. The blocks of data are parsed and produced as the overt data 715.

The covert data path begins with the ADC 712. The ADC 712 converts the amplified signal from the LNA 702 that is provided to the switch 704 through connection 703 and to the ADC 706 through connection 705C. The ADC 712 converts the analog signals received to digital signals. The ADC 712 provides an in-phase digital signal on connection 719I and a quadrature digital signal on connection 719Q.

The I-channel decoder 714I performs inverse operations of the I-channel encoder 510I and the Q-channel decoder 714Q performs inverse operations of the Q-channel encoder 510Q, such as to recover modulated covert Q-channel data.

The decoders 714I and 714Q can include either a matched filter or a correlator. The I-channel decoder 714I and Q-channel decoder 714Q despread the spread spectrum data in embodiments in which the encoders 510I and 510Q implement respective spread spectrum encoding. In one or more embodiments, the I-channel decoder and the Q-channel decoder perform DSSS dispreading when the encoders 510I and 510Q perform DSSS spreading.

The WSG 716 performs substantially the same operations as the WSG 512, with the WSG 716 performing operations on the receive side and based on a recovered data clock 711 (e.g., an estimated data clock) and an estimated frame sync 713. The WSG 716 determines when a frame ends by either computing clock cycles and knowing how many clock cycles are in a frame or from receiving a signal from the frame sync 713 indicating a new frame or that the previous frame has ended. The random number used by the WSG 512 can also be known by the WSG 716. As previously discussed, the random number can be generated at runtime or predetermined. The procedure used to generate the random number(s) can be programmed or implemented by both the WSG 512 and the WSG 716. The WSGs 512 and 716 can thus remain in sync with each other. The random number can either reset at the start of each block, continue across multiple blocks (repeat after a specified number of blocks), or be random across all blocks. The WSG 716 provides the parameters 721 (the location of the covert data in the I-Q plane, and in time) to the Q-channel decoder 714Q and the I-channel decoder 714I. The parameters 721 can be specific data to help the decoder 714I. 714Q to perform either the filter or correlation operation(s) to recover the watermark. The WSG 716 also provides a control signal select A or B 723, to the switch 704. The select A or B 723, such as is similar to the select A or B 523, is set based on the recovered data clock, the frame sync, a predetermined timing or expected location of a covert data transmission, and/or the random number(s). The select A or B 723 is set so as to allow recovery of the covert data, where A is selected when no watermark is expected and B is selected when a watermark is expected. Note that the B line could always be selected to recover the overt and covert data, however such a configuration requires more processing than switching to the covert data path when covert data is expected.

The I-channel covert symbol demodulator 718I receives the decoded in-phase digital signal 725I and the Q-channel covert symbol demodulator 718Q receives the decoded quadrature digital signal 725Q. The demodulators 718I and 718Q demodulate the respective received signals. Demodulating the decoded in-phase digital signal 725I and the decoded quadrature digital signal 725Q includes generally performing inverse operations of the covert symbol modulator 516. The covert symbol demodulators 718I and 718Q provide demodulated data on the connection 727I and 727Q, respectively, to the symbol recovery module 720.

The symbol recovery module 720 interprets (I. Q) signal pairs provided by the demodulators 718I and 718Q. In one or more embodiments, the symbol recovery module 720 maps the (I, Q) pairs to binary or other data form. In one or more embodiments, the interpretation of the (I, Q) signal pairs is performed using a look-up table (e.g., a same look-up table that is implemented by symbol mapper 504 and/or 514). The look-up performed by the symbol recovery module 720 can be different from that of the symbol mapper 504 and/or 514. The symbol recovery module 720 performs a look-up of binary or other data values based on recovered (I, Q) values, while the symbol mapper 504 and/or 514 performs a look-up of (I, Q) values based on binary or other data.

The FEC code decoder (FECCD) 722 performs inverse operations of the FECCE 508, such as to recover the covert data 731. The FECCD 722 decodes Turbo code or LDPC encoded data in embodiments in which the encoders 510I and 510Q implement respective FEC code encoding.

The alarm module 724 receives the covert data (from connection 731) and produces an alert if the covert data is not as expected or if the covert data is not present. The alert can include a communication (e.g., an e-mail, text message, phone call, a prompt on a screen, or other communication), a sound, a light (e.g., a flashing light), or the like. The alert can indicate what the overt data of the communication included, a sender or recipient of the communication, a time of the communication, or other information regarding the transmission.

Figure 8:
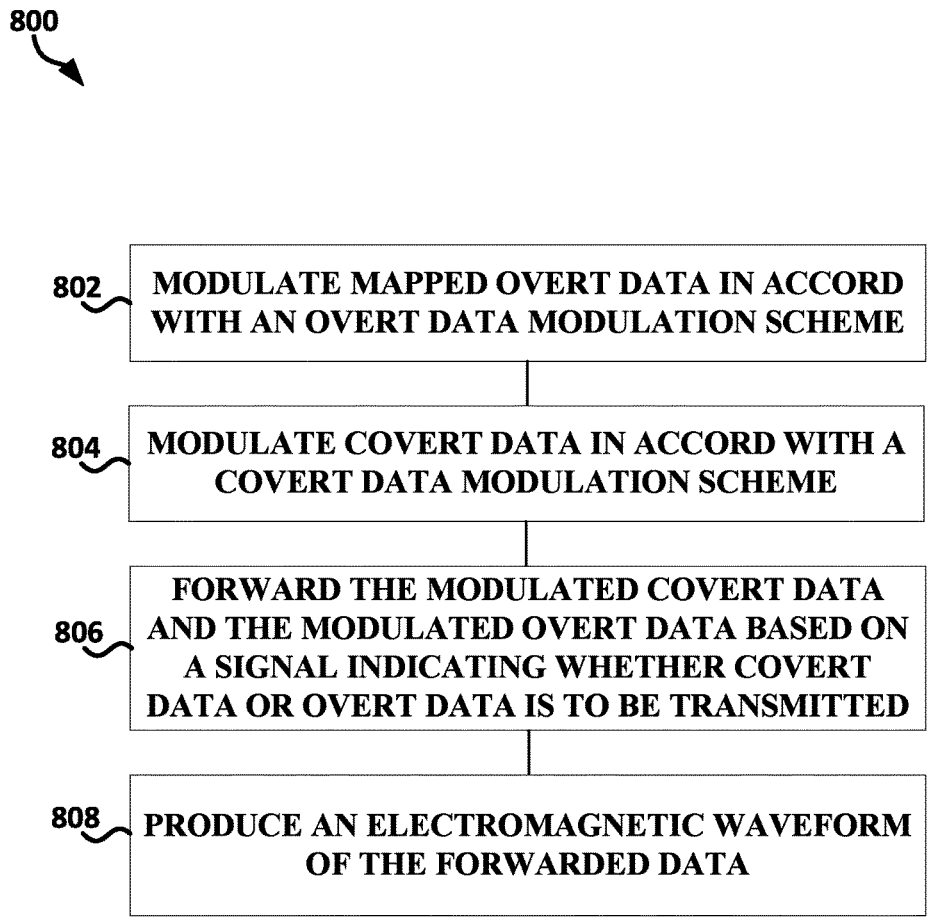
FIG. 8 illustrates, by way of example, a method for embedding covert data into an overt data transmission.

FIG. 8 illustrates, by way of example, a method 800 for embedding covert data into an overt data transmission. The method 800 as illustrated includes: modulating mapped overt data in accord with an overt data modulation scheme, at operation 802; modulating covert data in accord with a covert data modulation scheme, at operation 804; forwarding the modulated covert data and the modulated overt data based on a signal indicating whether covert data or overt data is to be transmitted, at operation 806; and producing, using an antenna, an electromagnetic waveform of the forwarded data, at operation 808. In one or more embodiments, the covert data includes the overt data with covert data embedded in the overt data as jitter.

The operation 804 can include modulating the overt data using dither modulation such that the modulated covert data includes jitter within about three orders of magnitude greater than that detectable by a high precision clock used to produce the covert data. In one or more embodiments, the high precision clock can include normal jitter on the order of femtoseconds and the jitter in the modulated covert data is on the order of picoseconds. The operation 802 modulating the overt data within a constellation of symbols. The operation 804 can include modulating the covert data within a single symbol region for every sub-constellation of four symbols in the constellation of symbols. In one or more embodiments, each symbol of the modulated covert data is located at a region about a centroid of a sub-constellation of four symbols. In one or more embodiments, signal energy of the modulated covert data is modulated so as to be statistically distributed about the symbol region in accord with a Gaussian distribution of locations about the region. In one or more embodiments, signal energy of the modulated covert data is statistically distributed such that there is less signal energy near the center of the region and more signal energy, on average, near an outer edge of the region.

The method 800 can further include encoding overt data on a covert data path to produce turbo code encoded data. The method 800 can further include encoding turbo encoded data using a spread spectrum technique. In one or more embodiments the spread spectrum technique is a DSSS technique. In one or more embodiments, the overt data modulation scheme is one of a quadrature phase shift keying (QPSK), sixteen quadrature amplitude modulation (QAM), and a sixty-four QAM modulation scheme and the covert data modulation scheme is one of a binary PSK (BPSK), a QPSK, and a sixteen QAM modulation scheme, respectively.

FIG. 9 illustrates, by way of example, a block diagram of an embodiment of a machine 900 on which one or more of the operations as discussed herein can be implemented. The machine 900 can include a computing device instantiated as a transmitter device and/or a receiver device. The machine 900 may be employed to host or be integral to hardware, software, and/or firmware that embeds covert data into overt data. One or more of the framing module 502, overt symbol mapper 504, overt symbol modulator 506. FECCE 508, I-channel encoder 510I, Q-channel encoder 510Q, covert symbol mapper 514. WSG 512, covert symbol modulator 516, switch 518, RF amp 520, LNA 702, switch 704, ADC 706, overt symbol demodulator 708, sync and framing module 710, ADC 712, I-channel decoder 714I, Q-channel decoder 714Q, WSG 716, covert symbol demodulator 718I and 718Q, symbol recovery module 720, and/or FECCD 722 can include one or more of the items of the machine 900. In one or more embodiments, the framing module 502, overt symbol mapper 504, overt symbol modulator 506. FECCE 508, I-channel encoder 510I, Q-channel encoder 510Q, covert symbol mapper 514, WSG 512, covert symbol modulator 516, switch 518. RF amp 520, LNA 702, switch 704, ADC 706, overt symbol demodulator 708, sync and framing module 710, ADC 712, I-channel decoder 714I, Q-channel decoder 714Q, WSG 716, covert symbol demodulator 718I and 718Q, symbol recovery module 720, and/or FECCD 722 can be implemented using one or more items of the machine 900. In alternative embodiments, the machine 900 operates as a standalone device or may be connected (e.g., networked) to other machines. In a networked deployment, the machine 900 may operate as a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example machine 900 includes a processor 902 (e.g., a central processing unit (CPU), a graphics processing unit (GPU) or both), a main memory 904 and a static memory 906, which communicate with each other via a bus 908. The machine 900 may further include a video display unit 910 (e.g., a liquid crystal display (LCD) or a cathode ray tube (CRT)). The machine 900 may include an alphanumeric input device 912 (e.g., a keyboard), a user interface (UI) navigation device 914 (e.g., a mouse), a disk drive unit 916, a signal generation device 918 (e.g., a speaker) and a network interface device 920.

The memory 904 or 906 are examples of a storage device that can include instructions stored thereon that are executed by a machine, such as a processor or other processing circuitry, and cause the machine to perform operations. The storage device can be programmed and maintained prior to its inclusion in a system. The instructions and other information can be encrypted or otherwise protected by one or more security measures, such as to help protect the operational boundaries and other data stored thereon.

The disk drive unit 916 as illustrated includes a machine-readable medium 922 on which is stored one or more sets of instructions and data structures (e.g., software) 924 embodying or utilized by any one or more of the methodologies or operations described herein. The instructions 924 may also reside, completely or at least partially, within the main memory 904 and/or within the processor 902 during execution thereof by the machine 900, the main memory 904 and the processor 902 also including machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, analog switches or circuits, solid-state memories, and optical and magnetic media. Specific examples of machine-readable media include non-volatile memory, including by way of example semiconductor memory devices, e.g., Erasable Programmable Read-Only Memory (EPROM). Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of transfer protocols (e.g., File Transfer over TCP/IP, UDP, etc.). Examples of communication networks include a local area network ("LAN") and wireless data networks (e.g., WiFi and WiMax networks). The network interface device 920 can include a transmit and/or receive radio and an antenna to communicate wirelessly to the network. The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. The framing module 502, overt symbol mapper 504, overt symbol modulator 506, FECCE 508, I-channel encoder 510I, Q-channel encoder 510Q, covert symbol mapper 514, WSG 512, covert symbol modulator 516, switch 518, RF amp 520, LNA 702, switch 704, ADC 706, overt symbol demodulator 708, sync and framing module 710, ADC 712, I-channel decoder 714I, Q-channel decoder 714Q, WSG 716, covert symbol demodulator 718I and 718Q, symbol recovery module 720, and/or FECCD 722 can be implemented using one or more modules. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein. "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

In one embodiment, the modules are written in a computer-programming and/or scripting language. Examples of such languages include, but are not limited to, C, C++. C#, Java, JavaScript, Perl, Python, or any other computer programming and/or scripting language now known or later developed.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

In an example, the hardware can include configurable processing circuitry. The processing circuitry includes electric and/or electronic components arranged to perform operations, such as operations discussed herein. Electric and/or electronic components can include one or more transistors, resistors, capacitors, inductors, multiplexers, arithmetic logic units, Boolean logic gates (e.g., AND, OR, NAND, NOR, or other logic gates) or other combinational logic, such as inverters, state logic, oscillators, diodes, switches, current and/or voltage regulators, application specific integrated circuits (ASICs), power supplies, current and/or voltage supplies, amplifiers, or the like, (e.g., transistors, logic gates (e.g., combinational and/or state logic), circuits, or other electric or electronic components) and a machine readable medium containing instructions, where the instructions configure the processing circuitry to carry out a specific operation when in operation. Accordingly, processing circuitry, such as can include one or more can be communicatively coupled to the machine readable medium when the device is operating. For example, under operation, the processing circuitry can be configured by a first set of instructions to implement a first module at one point in time and reconfigured by a second set of instructions to implement a second module. The modules can be implemented with the division of operations as explained herein or the division of operations can be different such that a single module implements one or more of the operations of two or more of the modules or multiple modules implement the operations of one of the modules.

Transmission circuitry is processing circuitry arranged to transmit an electromagnetic signal. Transmission circuitry can include components similar to the processing circuitry as well as a radio (transmit and/or receive radio), antenna, amplifier, analog to digital converter (ADC), phase-locked loop (PLL), or other circuitry for generating an electromagnetic waveform.

EXAMPLES AND ADDITIONAL NOTES

Example 1 can include or use subject matter (such as an apparatus, a method, a means for performing operations, or a machine readable storage device including instructions stored thereon that, when performed by the machine, can cause the machine to perform operations), such as can include or use a device for watermarking a waveform, the device comprising an overt symbol modulator to receive mapped overt data and provide overt data modulated in accord with an overt data modulation scheme, a covert symbol modulator to receive mapped covert data and provide, using dither modulation and micro-amplitude modulation, covert data modulated in accord with a covert data modulation scheme, a switch to receive the modulated covert data and the modulated overt data and forward the covert data and modulated overt data based on a signal indicating whether covert data is to be transmitted or covert data is to be transmitted, and transmission circuitry to produce an electromagnetic waveform of the modulated data from the switch.

Example 2 can include or use, or can optionally be combined with the subject matter of Example 1 to include or use a high precision clock that operates with a jitter on the order of femtoseconds, coupled to the overt symbol modulator and the covert symbol modulator.

Example 3 can include or use, or can optionally be combined with the subject matter of Example 2, to include or use, wherein the modulated covert data includes is dither modulated and amplitude modulated within about three orders of magnitude of a smallest amount of jitter detectable by the high precision clock.

Example 4 can include or use, or can optionally be combined with the subject matter of Example 3, to include or use, wherein the dither modulation in the modulated covert data is on the order of picoseconds.

Example 5 can include or use, or can optionally be combined with the subject matter of at least one of Examples 1-4, to include or use, wherein the modulated overt data includes a constellation of symbols and the modulated covert data includes a symbol for every sub-constellation of four symbols in the constellation of symbols.

Example 6 can include or use, or can optionally be combined with the subject matter of Example 5, to include or use, wherein each symbol of the modulated covert data is located at a region about a centroid of a sub-constellation of four symbols on a constellation diagram.

Example 7 can include or use, or can optionally be combined with the subject matter of Example 6, to include or use, wherein signal energy of the modulated covert data is statistically distributed about the region in accord with a Gaussian distribution of locations about the region.

Example 8 can include or use, or can optionally be combined with the subject matter of at least one of Examples 6-7, to include or use, wherein signal energy of the modulated covert data is statistically distributed such that there is less signal energy near the center of the region and more signal energy, on average, near an outer edge of the region.

Example 9 can include or use, or can optionally be combined with the subject matter of at least one of Examples 1-8, to include or use an encoder to receive data for a waveform watermark and produce turbo code encoded data.

Example 10 can include or use, or can optionally be combined with the subject matter of Example 9, to include or use an in-phase encoder to receive even or odd data symbols of the turbo encoded data and produce in-phase encoded data, and a quadrature encoder to receive odd or even data symbols of the turbo encoded data and produce quadrature encoded data, wherein the covert mapped data received at the covert modulator includes the in-phase encoded data and the quadrature encoded data mapped to fit the covert modulation scheme.

Example 11 can include or use, or can optionally be combined with the subject matter of Example 10, to include or use, wherein the quadrature encoder and the in-phase encoder both produce direct sequence spread spectrum (DSSS) encoded data.

Example 12 can include or use, or can optionally be combined with the subject matter of at least one of Examples 1-11, to include or use, wherein the overt modulation scheme is one of a quadrature phase shift keying (QPSK), sixteen quadrature amplitude modulation (QAM), and a sixty-four QAM modulation scheme and the covert modulation scheme is one of a binary PSK (BPSK), a QPSK, and a sixteen QAM modulation scheme, respectively.

Example 13 can include or use subject matter (such as an apparatus, a method, a means for performing operations, or a machine readable storage device including instructions stored thereon that, when performed by the machine, can cause the machine to perform operations), such as can include or use a method for watermarking a waveform, the method comprising modulating mapped overt data in accord with an overt data modulation scheme, modulating, using dither modulation and micro-amplitude modulation, covert data in accord with a covert data modulation scheme, forwarding the modulated covert data and the modulated overt data based on a signal indicating whether covert data or overt data is to be transmitted, and producing, using transmission circuitry, an electromagnetic waveform of the forwarded data.

Example 14 can include or use, or can optionally be combined with the subject matter of Example 13, to include or use, wherein the modulating covert data includes modulating the overt data using dither modulation such that the modulated covert data includes jitter within about three orders of magnitude greater than that detectable by a high precision clock used to produce the covert data.

Example 15 can include or use, or can optionally be combined with the subject matter of Example 14, to include or use, wherein the high precision clock includes normal jitter on the order of femtoseconds and the jitter in the modulated covert data is on the order of picoseconds.

Example 16 can include or use, or can optionally be combined with the subject matter of at least one of Examples 13-15, to include or use, wherein modulating the overt data includes modulating the overt data within a constellation of symbols and modulating the covert data includes modulating the covert data within a single symbol region for every sub-constellation of four symbols in the constellation of symbols.

Example 17 can include or use subject matter (such as an apparatus, a method, a means for performing operations, or a machine readable storage device including instructions stored thereon that, when performed by the machine, can cause the machine to perform operations), such as can include or use modulating mapped overt data in accord with an overt data modulation scheme, modulating, using dither modulation and micro-amplitude modulation, covert data in accord with a covert data modulation scheme, forwarding the modulated covert data and the modulated overt data based on a signal indicating whether covert data or overt data is to be transmitted, and producing an electromagnetic waveform of the forwarded data.

Example 18 can include or use, or can optionally be combined with the subject matter of Example 17 to include or use receiving overt data and producing turbo code encoded overt data.

Example 19 can include or use, or can optionally be combined with the subject matter of Example 18 to include or use receiving even or odd data symbols of the turbo encoded data and producing in-phase encoded data, receiving odd or even data symbols of the turbo encoded data and producing quadrature encoded data, wherein the covert mapped data includes the in-phase encoded data and the quadrature encoded data mapped to fit the covert modulation scheme.

Example 20 can include or use, or can optionally be combined with the subject matter of Example 19 to include or use wherein the produced quadrature encoded data and the produced in-phase encoded data are encoded in accord with direct sequence spread spectrum (DSSS) operations.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device for watermarking a waveform, the device comprising:
    an overt symbol modulator to receive mapped overt data and provide overt data modulated in accord with an overt data modulation scheme;
    a covert symbol modulator to receive mapped covert data and provide, using dither modulation and micro-amplitude modulation, covert data modulated in accord with a covert data modulation scheme;
    a clock that operates with a jitter on the order of femtoseconds coupled to the overt symbol modulator and the covert symbol modulator;
    a switch to receive the modulated covert data and the modulated overt data and forward the covert data and modulated overt data based on a signal indicating whether covert data is to be transmitted and/or the overt data is to be transmitted; and
    transmission circuitry to produce an electromagnetic waveform of the modulated overt data and/or modulated covert data from the switch,
    wherein the modulated overt data includes a constellation of symbols and the modulated covert data includes a symbol for every sub-constellation of symbols in the constellation of symbols, wherein the symbol is within a perimeter of the sub-constellation.

2. The device of claim 1, wherein the modulated covert data includes jitter within about three orders of magnitude of a smallest amount of jitter detectable by the high precision clock.

3. The device of claim 2, wherein the jitter in the modulated covert data is on the order of picoseconds.

4. The device of claim 1, wherein the modulated covert data includes a symbol for every sub-constellation of four symbols in the constellation of symbols.

5. The device of claim 4, wherein each symbol of the modulated covert data is located at a region about a centroid of a sub-constellation of four symbols on a constellation diagram.

6. The device of claim 5, wherein signal energy of the modulated covert data is statistically distributed about the region in accord with a Gaussian distribution of locations about the region.

7. The device of claim 5, wherein signal energy of the modulated covert data is statistically distributed such that there is less signal energy near the center of the region and more signal energy, on average, near an outer edge of the region.

8. The device of claim 1, further comprising an encoder to receive data for a waveform watermark and produce turbo code encoded data.

9. The device of claim 8, further comprising:
    an in-phase encoder to receive even or odd data symbols of the turbo encoded data and produce in-phase encoded data; and
    a quadrature encoder to receive odd or even data symbols of the turbo encoded data and produce quadrature encoded data;
    wherein the covert mapped data received at the covert modulator includes the in-phase encoded data and the quadrature encoded data mapped to fit the covert modulation scheme.

10. The device of claim 9, wherein the quadrature encoder and the in-phase encoder both produce direct sequence spread spectrum (DSSS) encoded data.

11. The device of claim 1, wherein the overt modulation scheme is one of a quadrature phase shift keying (QPSK), sixteen quadrature amplitude modulation (QAM), and a sixty-four QAM modulation scheme and the covert modulation scheme is one of a binary PSK (BPSK), a QPSK, and a sixteen QAM modulation scheme, respectively.

12. A method for watermarking a waveform, the method comprising:
    modulating mapped overt data in accord with an overt data modulation scheme;
    modulating, using a high precision clock that operates with a jitter on the order of femtoseconds and using dither modulation and micro-amplitude modulation, covert data in accord with a covert data modulation scheme;
    forwarding the modulated covert data and the modulated overt data based on a signal indicating whether covert data or overt data is to be transmitted; and
    producing, using transmission circuitry, an electromagnetic waveform of the forwarded data,
    wherein the modulated overt data includes a constellation of symbols and the modulated covert data includes a symbol for every sub-constellation of symbols in the constellation of symbols, wherein the symbol is within a perimeter of the sub-constellation.

13. The method of claim 12, wherein the modulating covert data includes modulating the overt data using dither modulation such that the modulated covert data includes jitter within about three orders of magnitude greater than that detectable by the high precision clock used to produce the covert data.

14. The method of claim 13, wherein the high precision clock includes normal jitter on the order of femtoseconds and the jitter in the modulated covert data is on the order of picoseconds.

15. The method of claim 12, wherein modulating the covert data includes modulating the covert data within a single symbol region for every sub-constellation of four symbols in the constellation of symbols.

16. A non-transitory machine-readable storage device including instructions stored thereon which, when executed by processing circuitry, cause the processing circuitry to perform operations for watermarking a waveform, the operations comprising:
   modulating mapped overt data in accord with an overt data modulation scheme;
   modulating, using a high precision clock that operates with a jitter on the order of femtoseconds and using dither modulation and micro-amplitude modulation, covert data in accord with a covert data modulation scheme;
   forwarding the modulated covert data and the modulated overt data based on a signal indicating whether covert data or overt data is to be transmitted; and
   producing an electromagnetic waveform of the forwarded data,
   wherein the modulated overt data includes a constellation of symbols and the modulated covert data includes a symbol for every sub-constellation of symbols in the constellation of symbols, wherein the symbol is within a perimeter of the sub-constellation.

17. The storage device of claim 16, further comprising instructions stored thereon that, when executed by processing circuitry, cause the processing circuitry to perform further operations comprising receiving overt data and producing turbo code encoded overt data.

18. The storage device of claim 17, further comprising instructions stored thereon that, when executed by the processing circuitry, cause the processing circuitry to perform further operations comprising:
   receiving even or odd data symbols of the turbo encoded data and producing in-phase encoded data; and
   receiving odd or even data symbols of the turbo encoded data and producing quadrature encoded data;
   wherein the covert mapped data includes the in-phase encoded data and the quadrature encoded data mapped to fit the covert modulation scheme.

19. The storage device of claim 18, wherein the produced quadrature encoded data and the produced in-phase encoded data are encoded in accord with direct sequence spread spectrum (DSSS) operations.

* * * * *

UNITED STATES PATENT AND TRADEMARK OFFICE
CERTIFICATE OF CORRECTION

PATENT NO. : 10,169,613 B2  
APPLICATION NO. : 15/052181  
DATED : January 1, 2019  
INVENTOR(S) : Graceffo et al.

Page 1 of 1

It is certified that error appears in the above-identified patent and that said Letters Patent is hereby corrected as shown below:

In the Specification

In Column 4, Line 42, delete "503" and insert --502-- therefor

In Column 7, Line 21, delete "512" and insert --514-- therefor

In Column 7, Line 25, delete "516" and insert --512-- therefor

In Column 9, Line 31, delete "714I." and insert --714I,-- therefor

In Column 9, Line 57, delete "(I. Q)" and insert --(I, Q)-- therefor

In Column 11, Line 7, delete "506." and insert --506,-- therefor

In Column 11, Line 9, delete "514." and insert --514,-- therefor

In Column 11, Line 17, delete "506." and insert --506,-- therefor

In Column 11, Line 20, delete "518." and insert --518,-- therefor

In Column 13, Line 21, delete "herein." and insert --herein,-- therefor

In Column 14, Line 1, delete "C++." and insert --C++,-- therefor

Signed and Sealed this  
Nineteenth Day of January, 2021

Andrei Iancu  
*Director of the United States Patent and Trademark Office*